United States Patent

[11] 3,586,849

| [72] | Inventors | Gary K. Starkweather;<br>George R. Simpson, both of Rochester, N.Y. |
|---|---|---|
| [21] | Appl. No. | 731,960 |
| [22] | Filed | May 24, 1968 |
| [45] | Patented | June 22, 1971 |
| [73] | Assignee | Xerox Corporation<br>Rochester, N.Y. |

[54] ILLUMINATION SYSTEM
9 Claims, 6 Drawing Figs.

[52] U.S. Cl. ..................................................... 240/41.35,
355/70
[51] Int. Cl. ..................................................... F21v 7/00,
G03b 27/54
[50] Field of Search ........................................ 240/41.1,
41.35, 41.37; 355/70, 67, 68, 69

[56] References Cited
UNITED STATES PATENTS
2,972,931  2/1961  Rool ............................ 355/70

| 3,302,519 | 2/1967 | Young ........................ | 355/67 |
| 3,428,397 | 2/1969 | Elmer ........................ | 355/70 |

FOREIGN PATENTS
| 64,022 | 10/1912 | Switzerland ................ | 355/70 |
| 605,609 | 2/1926 | France ...................... | 355/67 |

Primary Examiner—Samuel S. Matthews
Assistant Examiner—Richard M. Sheer
Attorneys—Paul M. Enlow, Norman E. Schrader, James J. Ralabate and Ronald Zibelli ABSTRACT: An illumination system having four lamps arranged orthogonally around a subject to be illuminated with each lamp positioned outside the corresponding adjacent edge of the subject. A bireflector having cylindrical and/or ellipsoidal surfaces is associated with each of the lamps for directing light rays to the subject from the adjacent edge thereof to the edge opposite thereto.

INVENTORS
GARY K. STARKWEATHER
GEORGE R. SIMPSON

PATENTED JUN22 1971

INVENTORS
GARY K. STARKWEATHER
GEORGE R. SIMPSON

BY

ATTORNEYS

ILLUMINATION SYSTEM

This invention relates to illumination systems, and particularly, to improvements in the arrangement of lamps and associated reflectors relative to a subject to be illuminated. The illumination system arranged in accordance with the present invention is particularly adapted for use with optical systems for illuminating originals to be reproduced in automatic copiers/reproducers that are particularly adapted to high-speed operation and capable of having its sequence timing varied thereby permitting variable speeds of output.

As is well known in recent years, the steadily increasing size of various industries has required an enormous increase in the amount of paperwork that must be accomplished, maintained, and made available for wide interplant circulation. In the present day commercial automatic copiers/reproduction machines, which are adapted to produce copies of between 5 and 60 8×11 inch sheets of copy per minute, the photoreceptor device is in the form of a drum which rotates in timed unison relative to plurality of processing stations.

The limiting feature in these present day machines is the use of the xerographic drum which seriously limits the positioning and action of each of the processing devices and, in particular, the requirement of presenting a flowing image upon the xerographic drum as a document is being scanned.

The mechanism which accomplishes the scan of a fixed document in the drum-type copier/duplicator generally involves a slidable carriage for supporting illumination lamps in addition to drive mechanisms, levers, pulleys, switches, etc. for accomplishing scanning of the document. As the demands for faster copying or duplicating has come about, these conventional machines generally have been modified in their respective drive systems and electrical circuits in order to accomplish a faster scan for the scanning mechanisms already in the machine. The result of these modifications is to propel the structures that go to make up the scanning mechanisms at very great speeds and, as will be apparent, will place great undue burdens upon the structural supports of the machine and the scanning mechanism.

As a solution for overcoming the multitude of disadvantages for high-speed copying, the latest machine concept for copiers utilizes flash exposure of a document and the arrangement of a moving photoconductor material in a flat condition at the instant of exposure. However, in order to overcome the loss of exposure time that these copiers usually demand the intensity of the illumination lamps, in order to accomplish adequate imaging, must be extremely high requiring specially designed lamps and overly large power sources.

It is therefore the principal object of this invention to improve illumination systems for effecting maximum capability of the lamps utilized therein, which system is capable for general copying applications and for making high-speed copies in variable time sequences.

Another object of this invention is to improve illumination systems for flat objects wherein dark spots and light spots are substantially eliminated.

Another object of this invention is to improve illumination systems whereby light rays produced thereby when directed upon an object being illuminated is such as to effect homogeneous illumination at an image plane.

Another object of this invention is to improve illumination systems employing elongated lamps by arranging the same so as to achieve uniform illumination at maximum intensity and with a minimum of power requirements.

These and other objects of this invention are obtained by means of the orthogonal arrangement of a plurality of elongated light sources which are positioned outside the outer edges of a flat object being illuminated. The light rays from each of lamps are directed on the adjacent edge of the object and extend across the object to the remote edge thereof thereby overlapping the light rays from the other lamps. In conjunction with each lamp there is provided a bireflector member for optimizing the projection of the light rays from each lamp to the object.

For a better understanding of the invention as well as other objects and further features thereof, reference is had to the following detailed description of the invention to be read in conjunction with the accompanying drawings, wherein.

Figure 1:
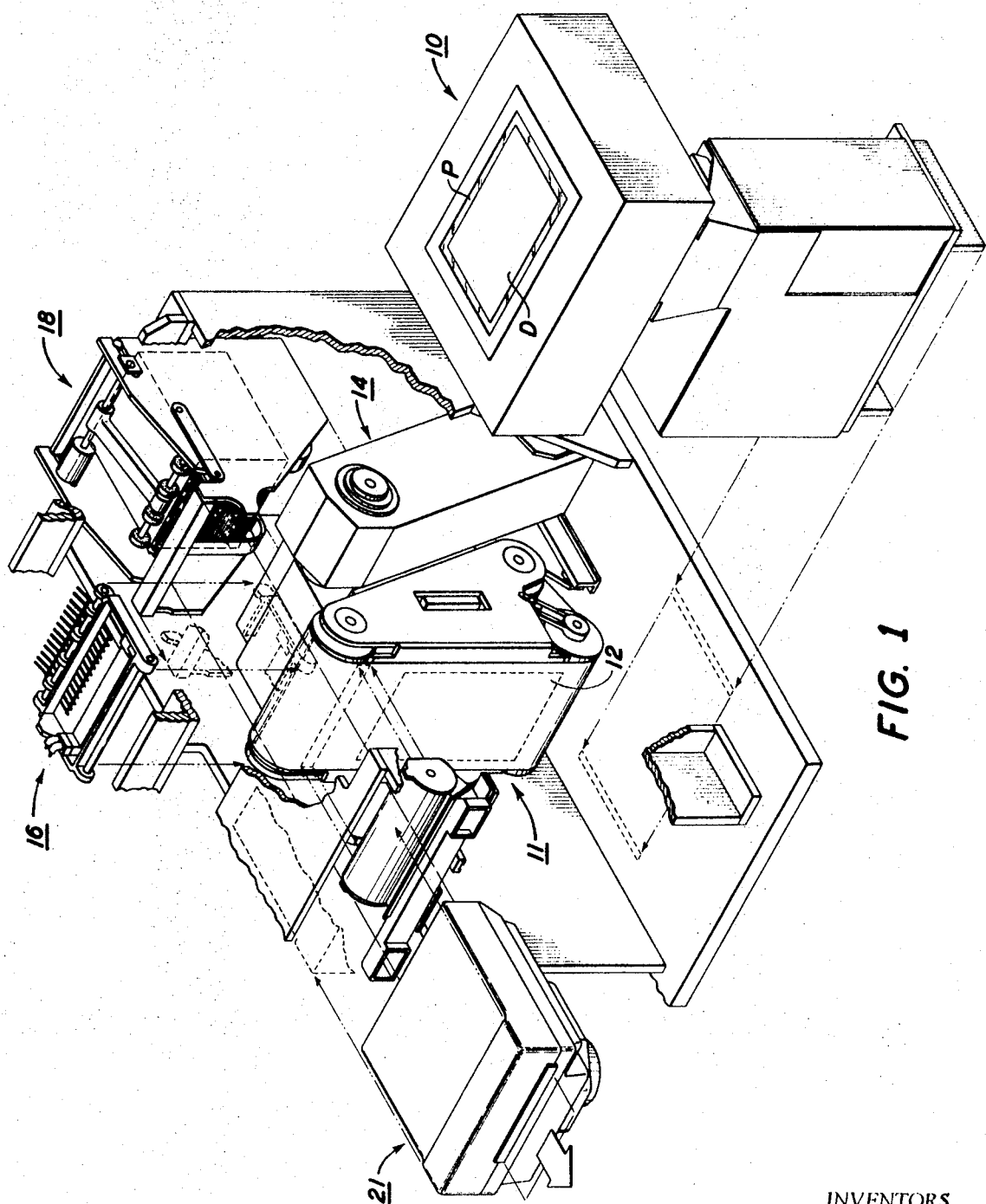
FIG. 1 is an exploded right-hand perspective view of a reproduction machine incorporating the present invention therein with the processing components separated to better illustrate the invention.
Figure 2:
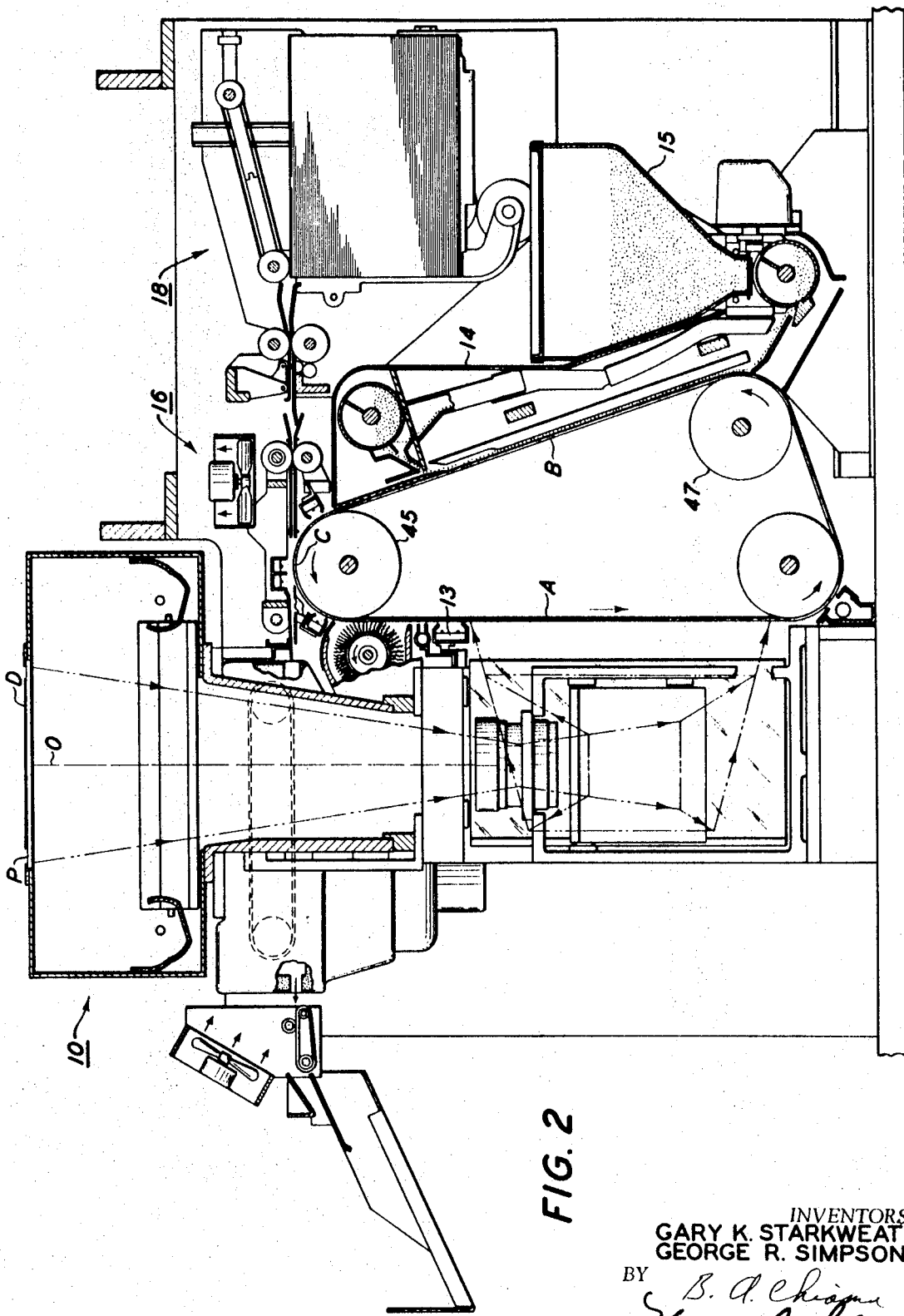
FIG. 2 is a schematic sectional view of the reproduction machine showing the various xerographic processing stations.

For a general understanding of the illustrated copier/reproduction machine, in which the invention may be incorporated, reference is had to FIGS. 1 and 2 in which the various system components for the machine are schematically illustrated. As in all electrostatic systems such as a xerographic machine of the type illustrated, a light image of a document to be reproduced is projected onto the sensitized surface of a xerographic plate to form an electrostatic latent image thereon. Thereafter, the latent image is developed with an oppositely charged developing material to form a xerographic power image, corresponding to the latent image on the plate surface. The power image is then electrostatically transferred to a support surface to which it may be fused by a fusing device whereby the powder image is caused permanently to adhere to the support surface.

In the illustrated machine, an original to be copied is placed upon a transparent support platen P fixedly arranged in an illumination assembly generally indicated by the reference numeral 10, arranged at the left end of the machine. While on the platen, an illumination system, to be described herein, flashes light rays upon the original thereby producing image rays corresponding to the informational areas on the original. The image rays are projected by means of an optical system for exposing the photosensitive surface of a xerographic plate in the form of a flexible photoconductive belt arranged on a belt assembly generally indicated by the reference numeral 11.

The photoconductive belt assembly 11 is slidably mounted upon a support bracket secured to the frame of the machine and is adapted to drive a selenium belt 12 in the direction of the arrow as shown in FIG. 2 at a constant rate. During this movement of the belt, the reflected light image of an original on the platen is flashed upon the xerographic surface of the belt, at such a speed measured in microseconds, that the relative motion of the light rays comprising the light image and the belt surface is minimal. The belt surface that intercepts the light rays comprises a layer of photoconductive material such as selenium on a conductive backing that is sensitized prior to exposure by means of a charging corona generator device indicated at 13.

The flash exposure of the belt surface to the light image discharges the photoconductive layer in the areas struck by light, whereby there remains on the belt a latent electrostatic image in image configuration corresponding to the light image projected from the original on the supporting platen. As the belt surface continues its movement, the electrostatic image passes through a developing station B in which there is positioned a developer assembly generally indicated by the reference numeral 14 and where the belt is maintained in a flat condition. The developer assembly 14 comprises a vertical conveying mechanism which carries developing material to the upper part of the belt assembly 11 whereat the material is dispensed and directed to cascade down over the upwardly moving inclined selenium belt 12 in order to provide development of the electrostatic image.

As the developing material is cascaded over the xerographic plate, toner particles in the development material are deposited on the belt surface to form powder images. As toner powder images are formed, additional toner particles are supplied to the developing material in proportion to the amount of toner deposited on the belt during xerographic processing. For this purpose, a toner dispenser generally indicated by reference numeral 15 is used to accurately meter toner to the developer material in the developer assembly 14.

The developed electrostatic image is transported by the belt to a transfer station C whereat a sheet of copy paper is moved at a speed approximately in synchronism with the moving belt in order to accomplish transfer of the developed image. There is provided at this station a sheet transport mechanism generally indicated at 16 adapted to transport sheets of paper from a paper handling mechanism generally indicated by the reference numeral 18 to the developed image on the belt at the station C. The paper handling mechanism includes a paper support tray for holding a stack of paper or the like, a separating roller adapted to feed the top sheet of the stack to feed rollers which direct the sheet material into contact with transporting devices in the sheet transport mechanism 16.

The transfer of the developed powder image from the selenium belt surface to sheet material is effected by means of a corona transfer device that is located within the sheet transport mechanism to the point of contact between the sheet and selenium belt as the sheet passes the transfer station C. The corotron 19 may include one or more corona discharge electrodes that are energized from a suitable high potential source and extend transversely across the selenium belt and are substantially enclosed within a shielding member.

After the sheet is stripped from the belt 12 by the corona discharge device and as the sheet of paper leaves the sheet transport, it is conveyed into a fuser assembly generally indicated by the reference numeral 21 wherein the developed and transferred xerographic powder image on the sheet material is permanently affixed thereto. After fusing, the finished copy is discharged from the apparatus at a suitable point for collection externally of the apparatus. To accomplish this there is provided a short horizontal conveyor which conveys a sheet of material out of the fuser assembly 21 and into a suitable catch tray supported upon the machine frame.

The next and final station in the device is a belt cleaning station having positioned therein a corona precleaning device similar to a corona charging device to impose an electrostatic charge on the selenium belt and residual powder adherent thereto to aid in effecting the removal of the powder, a belt cleaning assembly including a rotating brush device adapted to remove any powder remaining on the xerographic belt after transfer and a source of light, in the form of lamp, whereby the selenium belt 12 is flooded with light to cause dissipation of any residual electrical charge remaining on the xerographic drum.

Suitable drive means may be arranged to drive the selenium belt 12 in conjunction with timed flash exposure of an original to be copied to effect conveying and cascade of toner material, to separate and feed sheets of paper and to transport the same across the transfer station C and to convey the sheet of paper through the fuser assembly in timed sequence to produce copies of the original.

It is believed that the foregoing description is sufficient for the purposes of this application to show the general operation of an electrostatic copier using an illumination system constructed in accordance with the invention. For further details concerning the specific construction of the electrostatic copier, reference is made to copending application Ser. No. 731,934 filed concurrently herewith in the name of Hewes et al.

The illumination assembly 10 is illustrated in detail in FIGS. 3—6 and is designed for irradiating the diffusely reflecting original D such that the image of the original produced by a lens has irradiance uniformity to a maximum of one percent. This uniform image irradiance is obtained by the orthogonal placement of four linear light sources $L_1$, $L_2$, $L_3$ and $L_4$ and is enhanced by the use of the associated reflectors $R_1$, $R_2$, $R_3$ and $R_4$. The arrangement is such as to compensate for the relative illumination functions of the lens, for example, the illumination falloff due to vignetting of the optical aperture for the system and to the cosine to the fourth power law.

Each of the four linear light sources, which may be in the form of a fluorescent lamp or other gaseous discharge tube, is provided with two spaced apart reflectors one of which is elliptical and/or cylindrical. The radiometric equations for the elliptical and the cylindrical reflectors are utilized to project reflected light from a platen supporting an original onto an image plane where the irradiated image has near perfect irradiance.

Figure 4:
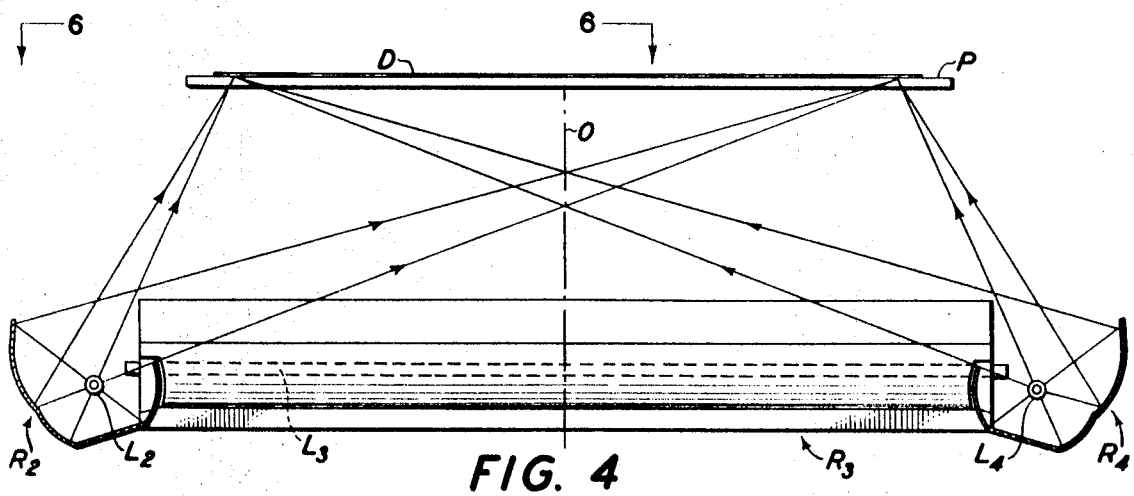
FIG. 4 is a sectional view of one side of the lamp assembly utilized for the illumination device.
Figure 5:
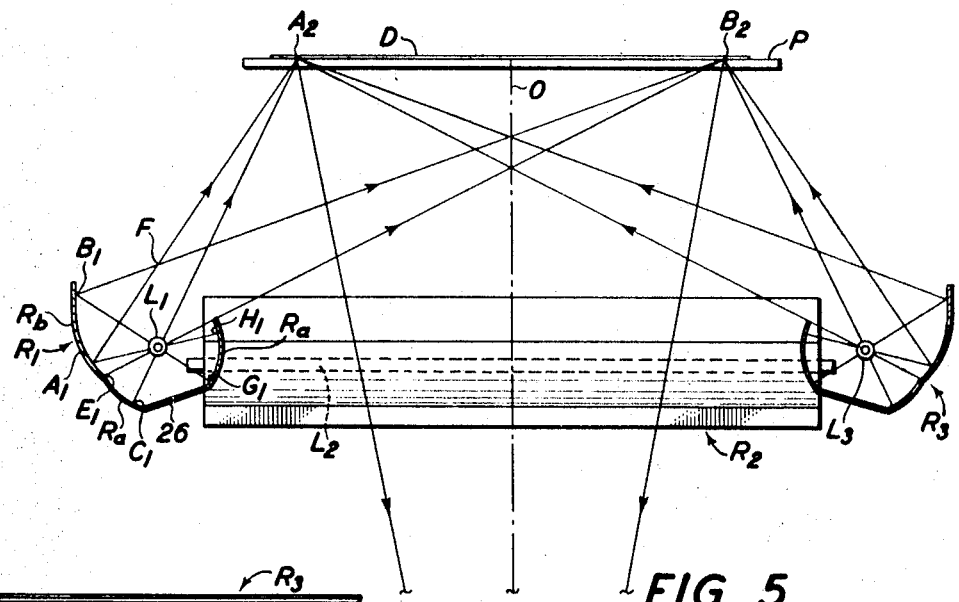
FIG. 5 is a sectional view of one end of the lamp assembly.
Figure 6:
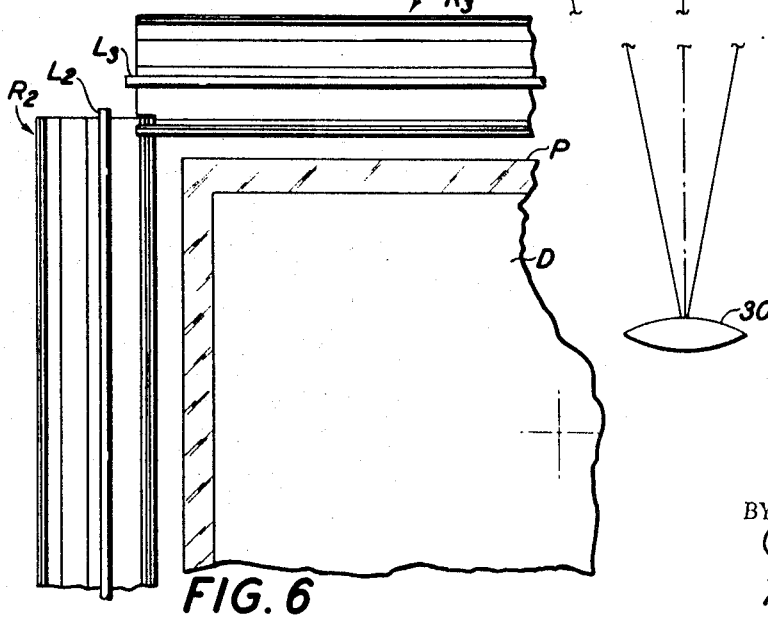
FIG. 6 is a partial top view of a portion of the lamp assembly and document platen.

As shown in FIGS. 4 and 5, the lamps $L_1$, $L_2$, $L_3$ and $L_4$ are arranged along the sides of a rectangle somewhat larger than the rectangle defined by the original D. The inner edges of the reflectors $R_1$, $R_2$, $R_3$ and $R_4$ being parallel to the respective lamps are also arranged as the sides of a rectangle having its inner edges spaced slightly outwardly from the edges which define the original. With this arrangement, the light rays which emanate from each of the lamps, are directed toward the original, to impinge thereon at various angles other than directly or at 90°. This arrangement, then, eliminates direct perpendicular impingement of the light rays upon the document thereby preventing excessively high intensity illumination of the edges of the document if such were extended over the light sources.

With light sources being located beyond the corresponding edges of the original D and, without the use of additional devices for directing light rays from the sources, the light impinging upon the document from the light source lamps would result in the homogeneous illumination of the photoconductive surface, but with a somewhat diminished intensity since much of the light emanating from the lamps are directed away from the original. The orthogonal relationship of the lamps located outside the outer edges of originals will effect this homogeneous irradiance that is not possible with an arrangement wherein only two sides of an original are provided with a lamp.

In order to enhance the homogeneous illumination wherein there will be a minimum amount of variation in the image irradiance from an original and, to increase the amount of light that can be directed toward the original D, the illumination system 10 is provided with specifically shaped bireflective surfaces for each of the linear lamps. These reflective surfaces are designed to direct light to specific portions of the original being illuminated and are so arranged that the impinging rays of one lamp and its corresponding bireflective pair of surfaces overlap with the impinging rays of the opposing lamp and its corresponding bireflective pair of surfaces. These reflected rays coupled with the rays from each of the lamps upon the original and result in a more uniform, homogeneous illumination of the photoconductive surface.

Each of the reflectors, and for simplicity the reflector $R_1$ will be the only one described in detail, comprises two reflecting surfaces. The reflector $R_1$ includes a first reflector surface $R_a$ having a flat spacer portion 26 between two segments of this surface and, is in the form of a right circular cylinder having the axis of the surface of revolution coincident with the axis of the linear lamp $L_1$. The reflector surfaces $R_a$, one for each of the reflectors in the illumination system 10, define the inner limits of the four assembled reflectors. When assembled, the surfaces define an opening through which the light rays emanating from an illuminated original are directed therethrough to a projection lens for the document illumination system.

Joined along the outer edge of the reflector surface $R_a$ is a second reflector surface $R_b$ in the form of an arc of an ellipse with one of its foci, illustrated at point F, along the line $A_1A_2$ which represents a light ray trace to the adjacent edge of the original D. The other focus point for the ellipsoid surface $R_b$ coincides with the point on $L_1$, the lamp centerline. The light ray $A_1A_2$ is produced by the reflection of a light ray from the lamp $L_1$ directed to the point $A_1$. Another light ray from the lamp $L_1$ is shown being reflected by the reflector surface $R_b$ at a point $B_1$ and is reflected to the opposite edge of the original D to a point $B_2$. The light rays $A_1A_2$ and $B_1B_2$ intersect at the focus F, in fact, it is this positioning of the focus that results in the positioning of the intersecting lines. Similar light rays from the lamp $L_1$ falling between the points $A_1$ and $B_1$ on the surface $R_b$ will be reflected toward the original at points between the points $A_2$ and $B_2$.

Similarly, each of the reflecting surfaces $R_b$ on the reflectors $R_2$, $R_3$ and $R_4$, the corresponding light ray lines $A_1A_2$ and $B_1B_2$ will be limiting light rays, that is, those light rays between which light rays will be reflected onto a document.

With the axis of the linear light source $L_1$ being the center of revolution for the cylindrical reflecting surface $R_a$, light rays emanating from the light source and impinging upon this reflecting surface will be directing to the original along different lines. Light impinging at the point $C_1$ on the surface $R_a$ for instance will be directed to the point $A_2$ on the original. Another light ray from the lamp $L_1$ impinging upon a point $E_1$ will be directed upon the point $B_2$, the other side of the document. Any other light ray impinging upon the reflecting surface $R_a$ between the points $C_1$ and $E_1$ will be reflected upon the original between the points $A_2$ and $B_2$.

The segment of the surface $R_a$ closest to the inner edge of the illumination assembly reflects light rays impinging thereon upon the ellipsoid surface $R_b$ rather than reflecting directly toward the document. For example, a light ray impinging upon the point $G_1$ will be directed to the point $B_1$ and redirected to the point $B_2$ upon the document. Similarly, light impinging upon point $H_1$ will be directed to the point $A_1$ whereupon this light ray will be reflected to the point $A_2$.

From the foregoing it will be apparent that the reflecting surfaces $R_a$ and $R_b$ serve to reflect the light rays emanating from the lamp $L_1$ upon the original D between both extreme edges thereof in overlapping fashion. This means the light reflected from the surface $R_a$ will be directed upon the document starting from the line coincident with the adjacent edge of the original, that is, the line extending along the edge of the original starting at point $A_2$, and sweeping across the document to the other edge thereof terminating in a line having its beginning at point $B_2$. Light reflected from the ellipsoid reflector $R_b$ is directed upon the document between these identical lines, that is, between lines beginning at $A_2$ and $B_2$ respectively. The light rays reflected from the surface of the segment of the surface $R_a$ nearest the adjacent edge of the original is reflected back upon the ellipsoid reflector $R_b$ and reinforces the light already directed upon this surface from the lamp $L_1$ directly, and from the outer segment of the surface $R_a$.

Similarly, as viewed in FIG. 5, the reflector $R_3$ serves to reflect light from the lamp $L_3$ upon the original D. The light rays so reflected overlap those reflected from the reflecting surfaces of the reflector $R_1$. In similar fashion, light is directed from the reflectors $R_2$ and $R_4$ by reflection from the lamps $L_2$ and $L_4$ respectively, upon the original in overlapping ray-trace arrangement.

The effect then, of the use of four orthogonally arranged lamps arranged beyond the edges of an original being illuminated, and especially with the provision of the specifically designed reflecting surfaces for each of the reflectors and the relative positions thereof, an original is illuminated in such a manner that the object irradiance is $\cos.^{14}$ or otherwise circularly symmetrical for the center point of the surface of the original. It will be apparent from this arrangement of reflecting surfaces that the illumination apparatus 10 makes effective use of a large part of the light flux emitted from the light sources except for those area wherein reflection losses are behind the lamps themselves. It will be appreciated from the foregoing that the arrangement of the lamps provides $\cos.^{14}$ illumination. By incorporating the illustrated elliptical reflector $R_b$ with each of the lamps, the resultant illumination profile for an object being illuminated is changed to be symmetrical. The use of the right circular cylindrical surfaces $R_a$ adds efficiency to the system.

Each of the lamps $L_1$, $L_2$, $L_3$ and $L_4$ is connected to an electrical circuit for energizing these lamps. For the particular reproduction machine illustrated in FIG. 2, the particular electrical circuit for energizing the lamps is in the form of a flashing circuit which will energize the lamps for short periods of time, such as, for example, 100 microseconds. In this particular use, this short period of time will be suitable for flash exposing the original D upon a photoreceptor surface such, for example, as the selenium belt 12, to be described hereinafter.

Figure 3:
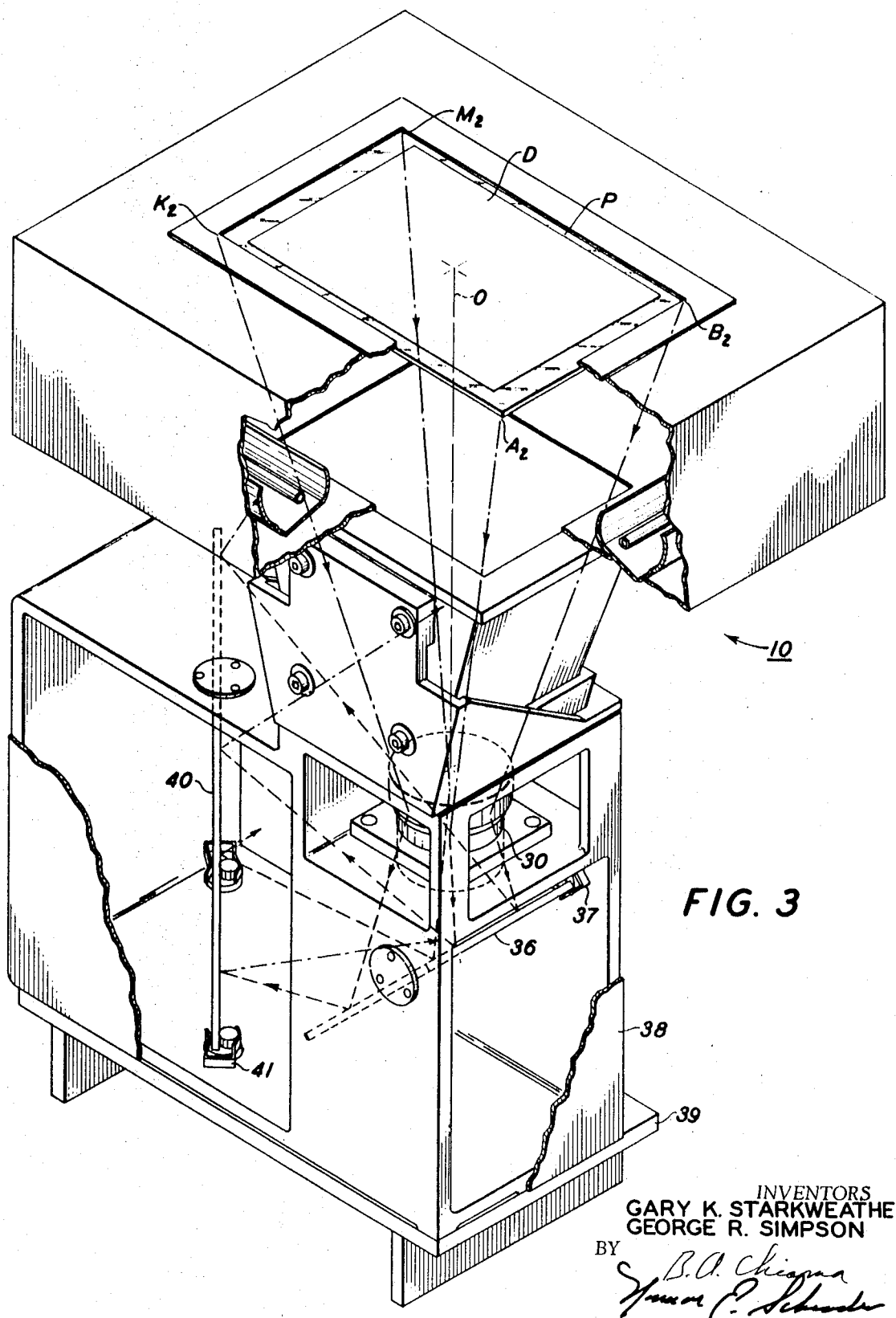
FIG. 3 is an isometric view of the illumination system arranged in accordance with the present invention.

The image forming light rays emanating from the original D during illumination thereof are directed to a projection lens system generally indicated by the reference numeral 30. For simplicity, light rays from each of the four corners of the original will be described and illustrated as an indication of the ray traces for the illuminated original. The light rays from the four corners of the original illustrated at $A_2$, $B_2$, $K_2$ and $M_2$ in FIG. 3, are directed through the projection lens 30 onto a first plane mirror 36 supported by brackets 37 within a mirror housing 38 secured to a suitable frame 39. The mirror is inclined at approximately 45° from the horizon for the vertically oriented optical axis O of the projection lens. Light rays reflected from the mirror 36 are directed upon a second plane mirror 40 supported by clamps 41 to inside portions of the housing 38 and is arranged with its plane at 45° to the optical axis of the projection lens 30. The mirror 40 is also rotated 45° relative to the plane of the mirror 36 in order to direct image rays therefrom along an optical axis normal to the optical axis O for the lens 30. The light rays reflected from the mirror 40 are directed upon the photoconductor surface of the selenium belt 12 arranged so that the exposure section thereof is flat and positioned vertically and normal to the impinging leg of the optical axis O for the image rays emanating from the mirror 40.

Each of the brackets 37, 41 are adapted to adjustably support their respective mirrors 36, 40 in order to insure that the image rays emanating from the document D will be directed centrally upon the selenium belt 12 at the exposure station A. With the use of a projection lens and two plane mirrors, the image formed upon the surface of the belt 45 will be upright and wrong reading and will expose the previously charged belt 12 for producing an electrostatic latent image thereon.

The illumination assembly 10, by virtue of the illumination housing 31 and the mirror housing 38 both of which are light tight and preferably coated with black paint or the like internally, will prevent image light rays from being distorted and affected by any external lighting. The assembly 10 is adapted to present light image representation of an original upon the selenium belt 12 sequentially in timed relation to the movement of the belt which in particular xerographic reproduction apparatus illustrated, continuously moves during the xerographic processing stations. The light image of the original being reproduced, in being reflected by the mirror 40 is directed out of the mirror housing 38 through a suitable rectangular opening on the side of the housing adjacent the selenium belt 12. The housing 38 then serves as a light shield for the selenium belt in order to present extraneous light from impinging upon a belt in order to present extraneous light from impinging upon a belt during use of the apparatus.

While the invention has been described with reference to the structures disclosed herein, it is not to be confined to the details set forth and this application is intended to cover such modifications or changes as may come within the purpose of the improvements of the following claims.

What we claim is:

1. An illumination system for illuminating a planar object defined by a plurality of sides including
    an elongated light source arranged in parallel with each side of the object, a reflecting surface of elliptical configuration for each light source having one of its line foci in coincidence with the longitudinal axis for the light source associated therewith, each of said reflecting surfaces having its other line foci for the same lying approximately along a line defined by the intersecting light rays reflected therefrom and impinging upon the object between the adjacent side thereof and side opposite thereto.

2. The illumination system of claim 1 for planar objects having a rectangular shape and the illumination system comprising four light sources, one parallel to each of the sides of the object.

3. The illumination system of claim 1 wherein each light source and its associated reflecting surface are positioned outside of the corresponding side of the object.

4. The illumination system of claim 1 wherein each light source has associated therewith a second reflecting surface of cylindrical configuration and having a line foci in coincidence with the longitudinal axis of its respective light source.

5. The illumination system in claim 4 wherein said second reflecting surface is of right circular cylindrical configuration.

6. In a projection apparatus for illuminating a planar object having at least two opposed boundaries and directing light rays emanating therefrom through a lens system and into an image plane, the combination of an illumination system including an elongated light source arranged parallel to and outside of each of said opposed boundaries of the object, a reflecting surface of right elliptical configuration for each of said light sources and having one of its line foci in coincidence with the longitudinal axis of the light source and its other line foci lying approximately along a line defined by the intersecting light rays reflected from the surface and impinging upon the object between the adjacent boundary and the boundary opposed thereto.

7. In a utilization device wherein a planar object is arranged to be illuminated and the light rays therefrom projected onto an image plane, an illumination system comprising at least two opposed elongated illumination devices each having a light source and a reflecting means arranged along the object such that each of at least two opposite boundaries of the object has one of said illuminating devices adjacent thereto, each of said light sources having its longitudinal axis disposed outside the boundary of the object adjacent thereto and arranged to direct light rays from that light source directly upon the object, across the same and to an opposite boundary thereof at angles less than 90° relative to the plane of the object and with an intensity that varies decreasingly from said adjacent boundary to said opposite boundary, each of said reflecting means being arranged relative to its corresponding light source for reflecting light rays from that source and to direct these rays between said adjacent boundary and said opposite boundary with an intensity that varies decreasingly from the former to the latter, said variations in intensities from each of said illumination devices being substantially equal whereby the resultant illumination irradiance at the image plane is substantially homogeneous.

8. The device of claim 7 for planar objects having a rectangular shape and the device comprising four light sources, one in parallel to each boundary of the object.

9. In a utilization device wherein a planar object is arranged to be illuminated and the light rays therefrom projected onto an image plane, an illumination system comprising at least two opposed elongated illumination devices each having a light source and a reflecting means arranged along object such that each of at least two opposite boundaries of the object has one of said illumination device adjacent thereto, each of said illumination devices having its longitudinal axis disposed outside the boundary of the object adjacent thereto and arranged for producing light rays which project upon the object with an intensity that varies decreasingly from said adjacent boundary to said opposite boundary, said variation in intensity of one of said illumination devices being substantially equal and from an opposite directional orientation relative to the variation of intensity of the other illumination device whereby the resultant irradiance illumination at the image plane is substantially homogeneous.